US006537350B2

(12) United States Patent
Gates-Anderson et al.

(10) Patent No.: US 6,537,350 B2
(45) Date of Patent: Mar. 25, 2003

(54) HEPA FILTER ENCAPSULATION

(75) Inventors: Dianne D. Gates-Anderson, Union City, CA (US); Scott D. Kidd, Brentwood, CA (US); John S. Bowers, Manteca, CA (US); Ronald W. Attebery, San Lorenzo, CA (US)

(73) Assignee: The Regents of the University of California, Oakland, CA (US)

( * ) Notice: Subject to any disclaimer, the term of this patent is extended or adjusted under 35 U.S.C. 154(b) by 68 days.

(21) Appl. No.: 09/782,582

(22) Filed: Feb. 13, 2001

(65) Prior Publication Data

US 2002/0137979 A1 Sep. 26, 2002

(51) Int. Cl.[7] ............................ B01D 19/00; G21F 9/00

(52) U.S. Cl. ........................ 95/266; 96/193; 55/DIG. 9; 588/6

(58) Field of Search ............................ 95/266; 96/193; 55/DIG. 9; 588/6, 7, 8, 2

(56) References Cited

U.S. PATENT DOCUMENTS

| | | | | | |
|---|---|---|---|---|---|
| 4,585,583 | A | * | 4/1986 | Roberson et al. | 588/8 |
| 4,613,348 | A | | 9/1986 | Natale | 55/318 |
| 4,726,825 | A | | 2/1988 | Natale | 55/318 |
| 4,839,102 | A | * | 6/1989 | Kertesz et al. | 524/4 |
| 5,288,434 | A | | 2/1994 | Brewer | 252/626 |
| 5,416,251 | A | * | 5/1995 | Lomasney et al. | 141/263 |
| 5,686,365 | A | | 11/1997 | Jantzen | 501/39 |

FOREIGN PATENT DOCUMENTS

| | | | | | |
|---|---|---|---|---|---|
| JP | 3-59499 | A | * | 3/1991 | 588/6 |

* cited by examiner

*Primary Examiner*—Robert A. Hopkins
(74) *Attorney, Agent, or Firm*—Eddie E. Scott; Alan H. Thompson

(57) ABSTRACT

A low viscosity resin is delivered into a spent HEPA filter or other waste. The resin is introduced into the filter or other waste using a vacuum to assist in the mass transfer of the resin through the filter media or other waste.

6 Claims, 2 Drawing Sheets

HEPA FILTER ENCAPSULATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to HEPA filers and more particularly to the disposal of HEPA filters.

2. State of Technology

U.S. Pat. No. 5,288,434 for a Hepa filter dissolution process by Brewer et al, patented Feb. 22, 1994, provides the following description, "A process for dissolution of spent high efficiency particulate air (HEPA) filters and then combining the complexed filter solution with other radioactive wastes prior to calcining the mixed and blended waste feed. The process is an alternate to a prior method of acid leaching the spent filters which is an inefficient method of treating spent HEPA filters for disposal."

U.S. Pat. No. 6,86,365 for a method for dissolution and stabilization of silica-rich fibers by Carol M. Jantzen, patented Nov. 11, 1997 provides the following description, "A method for dissolving silica-rich fibers such as borosilicate fibers, fiberglass and asbestos to stabilize them for disposal. The method comprises (1) immersing the fibers in hot, five-weight-percent sodium hydroxide solution until the concentration of dissolved silica reaches equilibrium and a only a residue is left (about 48 hours), then immersing the residue in hot, five-weight-percent nitric acid until the residue dissolves (about 96 hours). After adjusting the pH of the dissolved fibers to be caustic, the solution can then be added to a waste vitrification stream for safe disposal. The method is useful in disposing contaminated HEME and HEPA filters."

U.S. Pat. No. 4,613,348 for a disposable HEPA filtration device by Anothy Natale, patented Sep. 23, 1986, provides the following description: "A sealed filtration canister including a filtration mechanism sealed within the canister. A prefilter and a HEPA filter entrap asbestos-containing dust within the sealed canister. Upon usage of the filtration canister for a predetermined number of hours, the canister is disposed of in its entirety. The canister is used in conjunction with a separate vacuum cleaner device having a suction hose communicating with a canister lid removably mounted on top of the canister. Alternately, the canister is used with a portable vacuum motor assembly removably mounted on top of the canister to provide independent suction to the filtration canister.

SUMMARY OF THE INVENTION

The present invention provides the delivery of a low viscosity resin into a spent HEPA filter or other waste. The resin is introduced into the filter or other waste using a vacuum to assist in the mass transfer of the resin through the filter media or other waste. In one embodiment, a vacuum is applied to the resin in a vacuum chamber to remove entrained air. The low viscosity resin is introduced into the spent HEPA filter or other waste by a vacuum or pressure delivery system. Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

The drawings show specific embodiments of the invention. The detailed description of the embodiments and the drawings, together with the general description of the invention, serve to explain the principles of the invention. The in situ encapsulation process of the present invention incorporates a very simple process, maintains a safe work environment, and generates very little waste byproducts.

Figure 1:
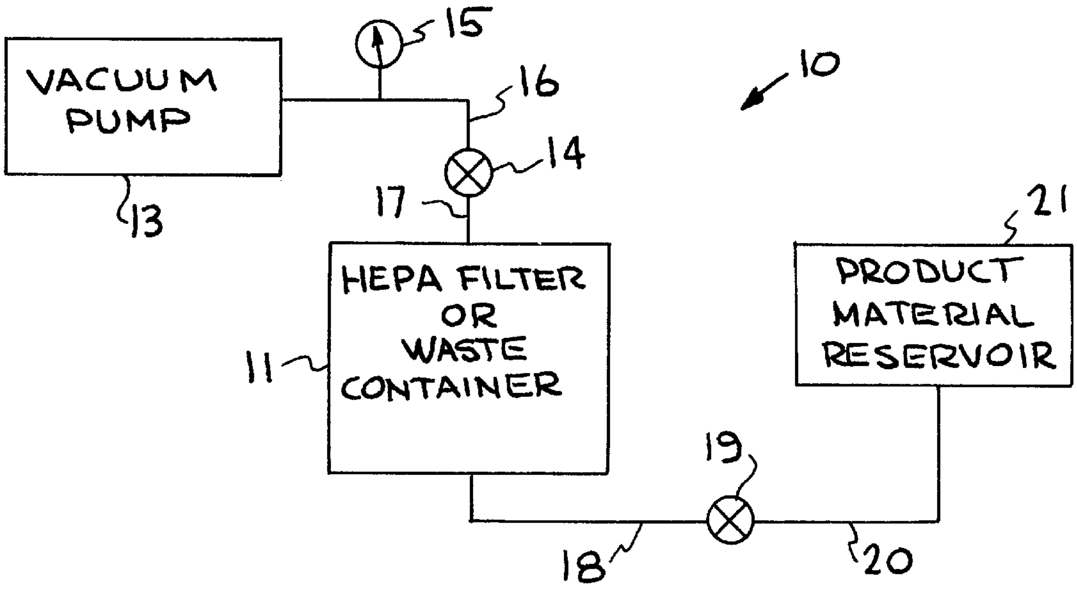
FIG. 1 shows a system constructed in accordance with the present invention.

Referring to FIG. 1 an embodiment of a system constructed in accordance with the present invention is shown. The system is generally designated by the reference numeral 10. The system provides an apparatus for preparing a HEPA filter for disposal. The process developed is robust and can be applied to other waste forms in addition to HEPA filters. Wasteforms that the process can be adapted to handle include waste such as diatomaceous earth used as filter media, debris, or lab trash contained in drums, carboys or boxes.

HEPA filters are High Efficiency Particulate Air filters that can be expected to remove 99.97% of particles out of the air. The particles can be as small as 0.3 microns in size. HEPA filters are also known as AEC, CWS, superinterception, absolute, and super high efficiency filters. They are generally throwaway extended-pleated-medium dry-type filters with a rigid casing enclosing the full depth of the pleats.

There is a considerable inventory of spent HEPA filters that require treatment or processing to meet RCRA land disposal restrictions. The spent filters exist both in government and private industry. The primary contaminants found in spent HEPA filters include radioactive compounds, metal oxides, salts and possibly organic compounds such as TCE and PCE.

Currently no disposal option exists for waste streams with this type of spent HEPA filter material or waste such as diatomaceous earth used as filter media, debris, or lab trash contained in drums, carboys or boxes due to concerns with leaching of particulate contaminants. Current treatment disposal options are limited.

A HEPA filter leaching process has been developed by Lockheed Martin Idaho Technology Company. The filter leaching process uses strong nitric acid solutions and air sparging to remove hazardous and radioactive compounds from spent filters. Although this technology works for most radionuclides and some metals, it is a very complicated process with substantial safety concerns for both workers and the environment. In addition, the leaching process generates large quantities of secondary waste that require further treatment.

A polyethylene macroencapsulation process has been developed by Envirocare of Salt Lake City. A spent HEPA filter is placed into a waste container and the annular region between the exterior of the filter and the interior of the waste container is filled with extruded polyethylene. The polyethylene hardens upon cooling. The polyethylene encapsulation process uses an encapsulation media that is difficult to handle and merely encases an intact filter and does nothing to immobilize particulate contaminants. Sampling of these macroencapsulated filters would include considerable worker hazards and would likely fail TCLP or STLC.

As shown in FIG. 1, contaminated HEPA filter or container of wastes 11 such as diatomaceous earth used as filter media, debris, or lab trash contained in drums, carboys or boxes is attached to the resin delivery system. A vacuum pump 13 provides a source of resin delivery which is operatively connected to the HEPA filter or waste container 11. A vacuum gauge 15 and a ball valve 14 are located in the line 16 that connects the vacuum pump 13 to the HEPA filter or waste container 11. A five gallon reservoir 21 containing product material provides a source of a low viscosity resin. The reservoir 21 is operatively connected to the HEPA filter or waste container 11. A ball valve 19 is connected to line 18 that leads to the HEPA filter or waste container 11. The ball valve 19 is also connected to a line 20 that leads to the reservoir 21.

The resin may be any suitable resin. Preferably it is a low viscosity resin. For example it may be a urethane resin. Urethanes are a huge family of resins with a wide variety of applications. Urethanes can be made to foam consistently, and can be rigid or flexible. Castable urethane resins are generally formulated to cure in a short time. Most urethane resins are a yellowish tan color to start, but are now widely available in white. There are a few companies offering a clear resin that is truly colorless. Urethanes are the least brittle resin, offering some give before they break. Some of the characteristics of the resin are:

Low viscosity

Water like consistency before curing

Pours easily

Pot life of at least 1 hour

Cures at room temperature

Generates its own heat during curing

No external heat needs to be applied during curing

Cures to a high strength, very hard final product

Minimal shrinking during curing

Companies that offer this type of resin are: BJB Enterprises, Inc. (WC-780 A/B Mass Casting Water Clear Rigid 82 Shore D Urethane Casting System); Polytek Development Corp. (POLYPOXY® Liquid Plastic 1010+Poly Cure 1212 Polypoxy® 1030+Poly Cure 1212); Epoxy Systems, Inc. Jericho, Vt. (Product #214); ETI-USA (Castin' Craft Clear Casting Resin); Bondaglass-voss (Clear Cast Resin and Catalyst system); and Smooth-On, Inc. (Crystal Clear 204.) Vagabond Corporation in Warner Springs, Calif. developed a urethane for artists' called "Odorless White." Today many companies offer their own version of Odorless White urethane, such as MasterCast from Kindt-Collins.

The specific resin used in the system 10 is a WATER CLEAR POLYURETHANE (WC) resin manufactured by BJB Enterprises, Inc., 14791 Franklin Avenue, Tustin, Calif. 92780. This group of flexible and rigid casting resins have been designed for use in applications requiring tough, tintable and pigmentable materials that will also maintain clarity in outdoor applications. With an array of hardnesses and working times, these materials are excellent for fabricating parts of all kinds. The WC series products work well for castings of all sizes and have been used to cast up to 9000 lbs. for one part.

The structural details of a system constructed in accordance with the present invention having been described, the method of operation of the system 10 will now be considered. The system 10 provides the delivery of a low viscosity resin into a spent HEPA filter. The resin is introduced into the filter in an upflow direction through the intake port in the HEPA filter or waste container 11 using a vacuum pump to provide the driving force and assist in the mass transfer of the resin through the filter media. The present invention provides a method of preparing a HEPA filter for disposal. The method includes the steps of applying a vacuum to the HEPA filter or waste container 11 and introducing a low viscosity resin into the spent HEPA filter while said HEPA filter is under vacuum.

After the resin has cured, a solid monolith remains which contains less than 0.1% void space. In the final product, any particulate material in the untreated filter is fully encapsulated in the resin and rendered non-leachable. This has been verified by subjecting post-treatment samples to regulatory extraction methods (TCLP and STLC). The encapsulated filter can be safely handled if sampling is required and is suitable for landfill disposal since the final product will meet RCRA land disposal criteria for waste HEPA filters classified as mixed or combined waste.

The present invention was designed to immobilize particulate contaminants in spent HEPA filters or other waste and is called the In Situ Stabilization and Filter Encapsulation (IS SAFE) process. This accomplishes two goals, increasing worker safety while handling spent filters or waste and preventing contaminants from leaching into the environment. As such, this process can be used at any government facility that has spent HEPA filters that require storage, treatment, or disposal. The process developed is robust and can be applied to other waste forms in addition to HEPA filters. Wasteforms that the process can be adapted to include waste such as diatomaceous earth used as filter media, debris, or lab trash contained in drums, carboys or boxes.

HEPA filters may be encapsulated having particulate immobilized in both the nuclear reactor industry and biomedical research and diagnosis industry. Regulated waste producers who form particularly hazardous or radioactive debris may also find this process useful.

Figure 2:
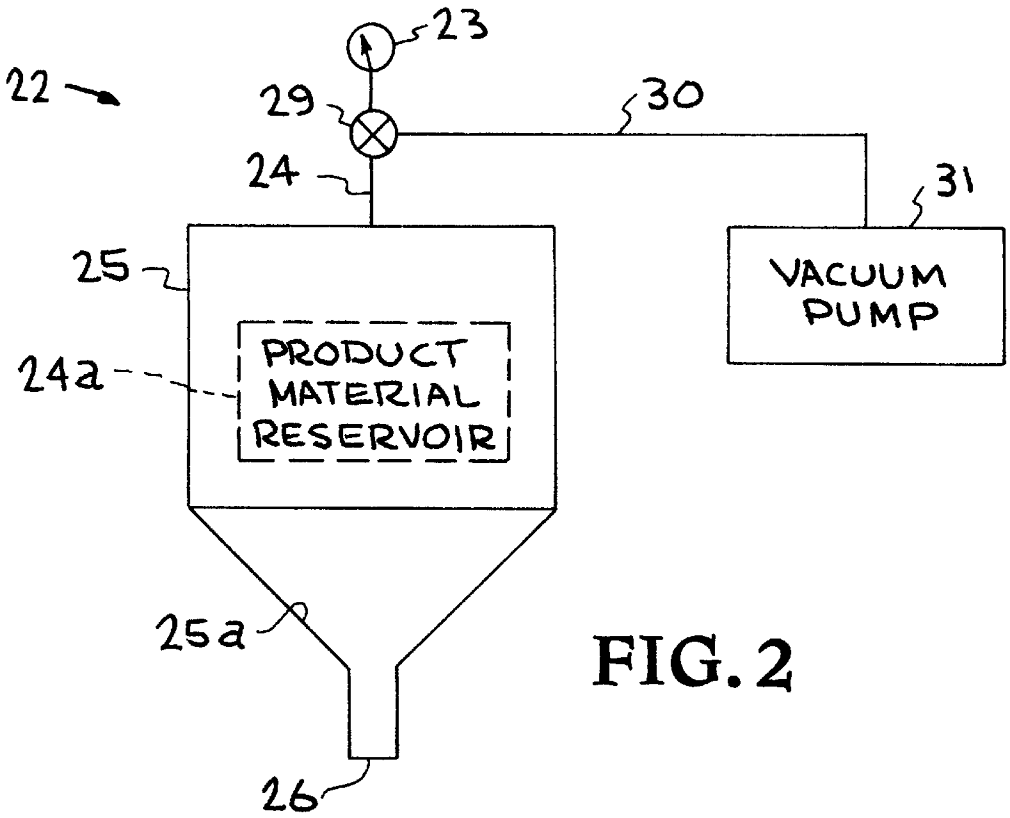
FIG. 2 shows a system for degassing the resin.

Referring now to FIG. 2, a system 22 for degassing the resin 24*a* is shown. A resin that can be used in this embodiment is WC-781 (or WC-780) MASS CASTING WATER CLEAR RIGID 82 SHORE D URETHANE CASTING SYSTEM that can be obtained from by BJB Enterprises, Inc., 14791 Franklin Avenue, Tustin, Calif. 92780. The resin is prepared and degassed in vacuum chamber 25 at between 20 and 30 mm of mercury to remove residual air from the product, prior to introduction into the filter. This process removes entrained gasses that can create bubbles and voids in the encapsulated HEPA filter. A vacuum gauge 23 and a ball valve 29 are located in the lines 24 and 30 that connect vacuum chamber 25 containing product material 24*a* and vacuum pump 31. The product material reservoir 24*a* is sealed inside the vacuum chamber 25 during degassing. In some embodiments (ie: large volume HEPA filters and waste containers) the resin may be mixed and degassed using an in-line mixer with or without vacuum chamber degassing, instead of batch mixing of the resin as previously described.

Figure 3:
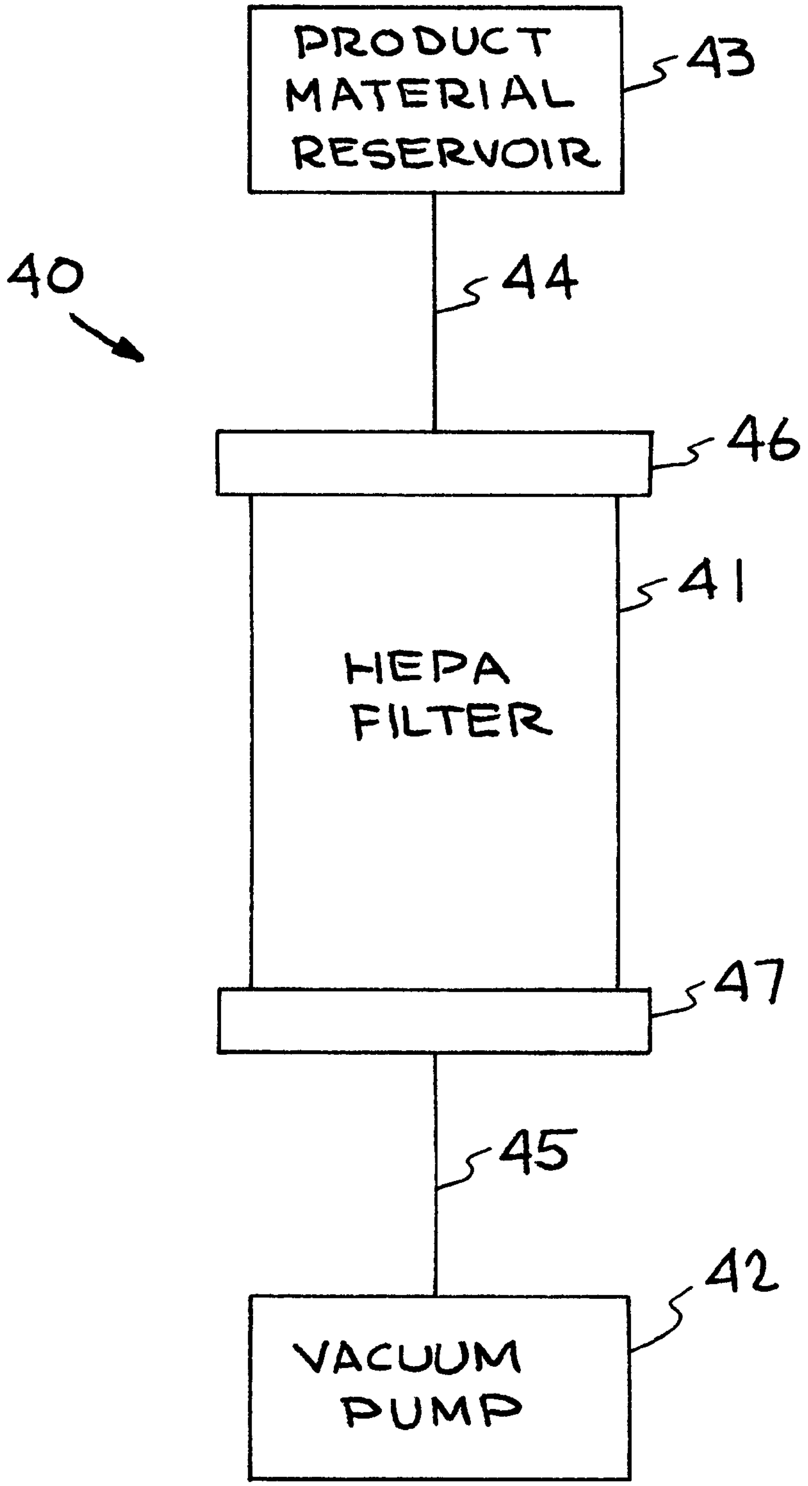
FIG. 3 shows another embodiment of a system constructed in accordance with the present invention.

Referring again to FIG. 1, the resin is delivered to the HEPA filter or other waste in a controlled fashion. For example: for a 50 cfm HEPA filter, the vacuum is carefully regulated and increased in 1 inch of water (gauge) increments at 1 minute intervals until a predetermined volume has been delivered to the spent HEPA filter. The processing time for a 50 cfm filter is approximately 25 minutes. The volume of resin added to the filter is approximately 2.65 gallons. The resin filled HEPA filter is allowed to cure at ambient temperature and pressure for a period of at least 24 hours. The final product is a solid monolith with less than 0.1 percent by volume of void space and 100 percent of the filter media coated with resin Another embodiment of the invention, generally designated by the reference numeral 40, is shown in FIG. 3. Spent HEPA filters are prepared for processing by attaching vacuum fittings 46 and 47 directly to the top and bottom openings of a HEPA filter 41. These fittings 46 and 47 are used to attach the HEPA filter to a vacuum system comprised of a vacuum pump 42, resin reservoir 43, and associated tubing 44 and 45 and fittings. Spent HEPA filters are prepared for processing by attaching vacuum fittings 46 and 47 to the top and bottom openings of the filter 41.

The system 40 provides the delivery of a low viscosity resin into a spent HEPA filter 41. The resin may be a urethane resin, such as WATER CLEAR POLYURETHANE (WC) resin manufactured by BJB Enterprises, Inc., 14791 Franklin Avenue, Tustin, Calif. 92780. The resin is introduced into the filter 41 using the vacuum pump 42 to provide the driving force and assist in the mass transfer of the resin through the filter media. The present invention provides a method of preparing a HEPA filter for disposal. The method includes the steps of applying a vacuum to the HEPA filter and introducing a low viscosity resin into the spent HEPA filter while said HEPA filter is in the vacuum state.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of preparing a HEPA filter comprising the steps of:

applying a vacuum to said HEPA filter, and introducing a resin to said HEPA filter while said HEPA filter is in said vacuum.

2. The method of preparing a HEPA filter for disposal of claim 1, including applying a vacuum to said resin for degassing said resin.

3. The method of preparing a HEPA filter for disposal of claim 1, wherein said resin is a low viscosity resin.

4. The method of preparing a HEPA filter for disposal of claim 1, wherein said resin is a low viscosity urethane resin.

5. The method of preparing a HEPA filter for disposal of claim 4, wherein said low viscosity urethane resin is a water clear polyurethane resin.

6. The method of preparing a HEPA filter for disposal of claim 1, wherein said resin has low viscosity, water like consistency before curing, pours easily, a pot life of at least 1 hour, cures at room temperature, generates its own heat during curing, cures to a high strength hard final product, and has minimal shrinking during curing.

* * * * *